United States Patent Office 2,927,910
Patented Mar. 8, 1960

2,927,910

ORGANOSILOXANE-PHENOL-ALDEHYDE RESIN CEMENTS

Ronald H. Cooper, Clare County, Mich., assignor to The Dow Chemical Company, Midland, Mich., a corporation of Delaware No Drawing. Application March 8, 1954
Serial No. 414,897

5 Claims. (Cl. 260—43)

This application relates to compositions comprising phenolic resins and certain organosilicon compounds.

With the growth of chemical technology the need for an acid resistant cement has become increasingly important. Acid resistant cements which are now available commercially are in general of two kinds, one is based upon a phenolic resin and the other on an alkali metal silicate. Both of these basic materials are quite resistant to acid when compared with Portland cement. However, they are still not sufficiently acid resistant to give prolonged life when subjected to acids, especially at elevated temperatures. The latter conditions gradually disintegrate the cement and cause failure at times varying from a few weeks to a year.

It is a primary object of the present invention to increase the life of phenolic cements in contact with acid and with water. Another object is to increase the mechanical strength of phenolic cements both in the dry state and when in contact with acids. Another object is to increase the dimensional stability of the cement by substantially eliminating swelling or shrinkage when in contact with an aqueous medium. Other objects and advantages will be apparent from the following description.

This invention relates to a composition comprising a phenol-aldehyde resin and from .5 to 15% by weight based on the weight of the phenolic resin of a siloxane in which at least a major portion of the polymer linkages are SiOSi and any remaining linkages are of the type SiSi and/or SiR'Si where R' is a divalent hydrocarbon radical. The remaining valences of the silicon atoms in the siloxane are satisfied by monovalent hydrocarbon radicals in the amount of on the average from 1 to 1.5 of said radicals per silicon atom and radicals of the formula OR" in which R" is an aliphatic hydrocarbon radical, in an amount of on the average from .03 to 2 OR" radicals per silicon atom. In said siloxane the sum of the average number of the hydrocarbon radicals and the OR" radicals is not greater than 3.

Any phenol-aldehyde resin can be employed in the compositions of this invention. For example, resins formed by polymerizing phenol with formaldehyde, acetaldehyde, butyraldehyde, and the like and resins formed by polymerizing aldehydes with modified phenols such as p-tertiary butyl phenol, p-tertiary amyl phenol, p-tertiary phenyl phenol or any other aliphatic or aryl substituted phenol. Preferably phenol-aldehyde resins should be in such a state of polymerization that they set readily at room temperature. If desired, catalysts such as benzene sulfonyl chloride may be employed to hasten the setting. For the purpose of this invention either oil modified or nonoil modified phenol-aldehyde resins may be employed although no advantage is gained by employing oil modification.

Organosilicon compounds which are operative in this invention are aliphatic hydrocarbonoxy substituted siloxanes. It has been found that completely hydrolyzed organosilicon resins when used alone are not satisfactory for use in this invention. For the purpose of this invention all of the silicon atoms in the siloxane can be connected through SiOSi linkages. In such cases the siloxanes would have the general formula $$R_nSi(OR'')_mO_{\frac{4-m-n}{2}}$$

in which R is a monovalent hydrocarbon radical, R" is as above defined and $n$ and $m$ have the average values 1 to 1.5 and .03 to 2 respectively. These compounds are known in the art as partially hydrolyzed siloxanes. They are commercially available products and are best prepared, for example, by partially alkoxylating the corresponding chlorosilanes and then adding sufficient water to the resulting chloroalkoxy compound to hydrolyze the chlorine thereby producing the alkoxylated siloxane.

If desired, the siloxanes employed may be those in which a majority of the silicon atoms are linked by SiOSi linkages and the remaining silicon atoms are linked by SiSi linkages and/or SiR'Si linkages or both types of linkages. Siloxanes containing all three of these linkages are commercially available materials and are best prepared by partially alkoxylating the so-called direct process residue by reacting it with the desired alcohol. This residue is obtained by reacting methyl chloride with silicon and thereafter removing methyl chlorosilanes boiling below 75° C. at atmospheric pressure. The residue is more fully described in the copending applications of Arthur J. Barry et al., Serial No. 338,123, filed February 20, 1953, now Pat. No. 2,681,355, and John W. Gilkey, Serial No. 357,921, filed May 27, 1953, now Pat. No. 2,774,779. The partially alkoxylated residue is partially hydrolyzed by removing the chlorine so that the resulting product is a complex material containing silicon bonded alkoxy groups.

As has been previously stated completely hydrolyzed siloxanes (i.e., those which contain no silicon bonded OR" groups) are not suitable for the purpose of this invention. However, the partially hydrolyzed siloxanes of this invention may contain minor amounts (i.e., less than 50 weight percent based on the total weight of the combined siloxanes) of completely hydrolyzed siloxanes of the unit formula $$R_xSiO_{\frac{4-x}{2}}$$

where R is as above defined and $x$ has an average value from 1 to 2.

For the purpose of this invention the R groups attached to the silicon can be any monovalent hydrocarbon radical such as for example methyl, ethyl, octadecyl, vinyl, allyl, cyclohexyl, cyclopentyl, tolyl, benzyl, phenyl, xenyl, and naphthyl. R' can be any divalent hydrocarbon radical such as methylene, ethylene, butylene, phenylene, and xenylene. R" can be any aliphatic hydrocarbon radical such as methyl, ethyl, propyl, isopropyl, butyl, octadecyl, vinyl, allyl, and cyclohexyl. Preferably R" should contain less than 6 carbon atoms.

If desired, the compositions of this invention may contain fillers. The presence of fillers are preferable for economic reasons since they tend to reduce the amount of phenolic resin needed for any given purpose. Suitable fillers include siliceous materials such as sand, crushed quartz, diatomaceous earth and the like.

In preparing the compositions of this invention the phenol-aldehyde resin and the organosilicon compound are mixed in any suitable fashion either by mechanical agitation or by dissolving in a mutual solvent. The resulting material may then be mixed with a suitable filler and a catalyst and applied to the joints to be cemented. No special precautions are needed to blend the materials except that the mixing should be sufficient to give a uniform distribution of the various ingredients.

The amount of organosilicon compound should not exceed 15% by weight of the weight of the phenol-aldehyde resin since larger amounts produce inferior products.

for 24 hours before removal. The briquettes were subjected to the test shown in the table. By way of comparison a cement containing no organosilicon compound and one containing a completely nonalkoxylated siloxane are included.

| | Composition in percent by weight based on weight of total composition | | | | Dry tensile strength in p.s.i. after 30 days | After 30 days in 20% HCl at 110° C. | | | After 30 days in distilled water at 100° C. | |
|---|---|---|---|---|---|---|---|---|---|---|
| | Phenolic resin | Siloxane | Filler | Catalyst | | Percent wt. change | Tensile in p.s.i. | Percent penetration | Percent wt. change | Tensile in p.s.i. |
| 1 | 44.02 | | 50.60 | 5.38 | 1,000 | +5.23 | 728 | 100 | +7.01 | 747 |
| 2 [1] | 41.80 | 5.00 | 48.08 | 5.12 | 900 | +7.18 | 760 | 100 | +7.20 | 790 |
| 3 [1] | 39.20 | 1.00 | 55.00 | 4.80 | 1,087 | +11.30 | 898 | 100 | +7.34 | 1,110 |
| 4 | 41.80 | 5.00 | 48.08 | 5.12 | 1,710 | −4.43 | 1,267 | 0 | +3.42 | 937 |
| 5 | 43.10 | 2.00 | 49.50 | 5.40 | 1,768 | −3.07 | 1,063 | 0 | | |
| 6 | 39.20 | 1.00 | 55.00 | 4.80 | 1,042 | −2.15 | 1,042 | 0 | +0.99 | 1,125 |
| 7 | 25.85 | 1.00 | 70.00 | 3.15 | 848 | −0.59 | 607 | 0 | | |
| 8 | 37.45 | 1.00 | 56.16 | 5.39 | 1,370 | −0.49 | 1,400 | 0 | +1.98 | 1,300 |
| 9 [2] | 37.45 | 1.00 | 56.16 | 5.39 | 1,188 | −3.90 | 1,590 | 0 | −1.90 | 1,460 |

[1] The siloxane employed in runs 2 and 3 was a benzene soluble nonalkoxylated polysiloxane resin composed of $SiO_2$ and $Me_3SiO_{.5}$ units in which there was an average of about 1.2 methyl groups per silicon atom.
[2] The siloxane employed in run 9 was a fluid material having the composition 67 mol percent phenylmethylsiloxane and 33 mol percent monophenyl siloxane, which contained 20% by weight silicon bonded methoxy groups.

The preferred amount of organosilicon compound is from 1.5 to 3% by weight based on the weight of the phenol-aldehyde resin. These proportions appear to give optimum properties both with regard to physical strength and with regard to water absorption. When the organosilicon compound is present in amounts less than .5% based on the weight of the phenolic resin little effect is observed.

The compositions of this invention are particularly useful as acid resistant cements which can be used in chemical processes. The specific advantages of the compositions of this invention over phenol-aldehyde resin cements containing no organosilicon compound are: low shrinkage or swelling under humid conditions, improved tensile strength, very little penetration of acid, very little loss of tensile strength when in contact with acid and water, very high electrical resistivity and a substantially decreased danger of cracking when used for lamination of tanks, in masonry joints, or in solid castings.

The following examples are illustrative only and should not be construed as limiting the invention which is properly delineated in the appended claims.

*Example 1*

The organosilicon compound employed in runs 4 to 8 inclusive of the table below was composed of a mixture of (A) 85% by weight of a fluid alkoxylated polysiloxane and (B) 15% by weight of a nonalkoxylated polysiloxane resin. The alkoxylated polysiloxane A had an average of about 1.1 total monovalent hydrocarbon radicals per silicon atom (said radicals being methyl, ethyl, propyl, and butyl) and 24% by weight silicon bonded methoxy groups. A major proportion of the silicon atoms in siloxane A were linked through SiOSi linkages and a minor proportion of the silicon atoms were linked through SiSi linkages and SiR'Si linkages in which R' was methylene or ethylene. This siloxane was prepared from the direct process residue by the method described supra.

The nonalkoxylated polysiloxane resin B was a copolymer composed of $SiO_2$ and $Me_3SiO_{.5}$ units in which there was an average of about 1.2 methyl groups per silicon atom. This resin was a benzene soluble material in which all of the polymer linkages were SiOSi linkages.

The phenolic resin employed in this example was a B stage resin composed of 44.5 parts by weight phenol and 20.5 parts by weight formaldehyde. The phenolic resin and the organosilicon compound were mixed with a 140 mesh silica filler and benzenesulphonylchloride in the amounts shown in the table below. The resulting mixture was cast into briquettes and allowed to harden in the mold

*Example 2*

Equivalent results are obtained when a fluid siloxane having the composition 67 mol percent phenylmethylsiloxane and 33 mol percent monophenylsiloxane which contains 30% by weight silicon bonded isopropoxy groups, is employed in the method of Example 1.

That which is claimed is:

1. A composition of matter comprising a mixture of a preprepared phenolaldehyde resin and from .5 to 15% by weight based on the weight of said phenolic resin of a siloxane composed of a mixture of (1) an aliphatic hydrocarbonoxy siloxane in which at least a major portion of the polymer linkages are SiOSi linkages and any remaining linkages are selected from the group consisting of SiSi and SiR'Si linkages where R' is a divalent hydrocarbon radical, the remaining valences of the silicon atoms in siloxane (1) being satisfied by monovalent hydrocarbon radicals in the amount of on the average from 1 to 1.5 of said radicals per silicon atom and radicals of the formula OR" in which R" is an aliphatic hydrocarbon radical, in amount of from on the average of .03 to 2 OR" radicals per silicon atom and (2) less than 50% by weight based on the total weight of the combined siloxanes of a completely hydrolyzed siloxane of the unit formula $$R_xSiO_{\frac{4-x}{2}}$$

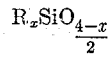

where R is a monovalent hydrocarbon radical and $x$ has an average value from 1 to 2.

2. A composition of matter comprising a mixture of a preprepared phenolaldehyde resin and from .5 to 15% by weight based on the weight of said phenolic resin of an aliphatic hydrocarbonoxy siloxane in which at least a major portion of the polymer linkages are SiOSi linkages and any remaining linkages are selected from the group consisting of SiSi and SiR'Si where R' is a divalent hydrocarbon radical, the remaining valences of the silicon atoms in said siloxane being satisfied by monovalent hydrocarbon radicals, in the amount of on the average from 1 to 1.5 said radicals per silicon atom and radicals of the formula OR" in which R" is an aliphatic hydrocarbon radical, in the amount of on the average from .03 to 2 OR" radicals per silicon atom.

3. A phenolic resin cement comprising a mixture of (1) a preprepared phenol-formaldehyde resin, (2) a filler, (3) a setting catalyst for the phenol-formaldehyde resin and (4) from .5 to 15% by weight based on the weight of the phenolic resin of a siloxane composed of a mixture of (A) an aliphatic hydrocarbonoxy siloxane in which at least a major portion of the polymer linkages are SiOSi linkages and any remaining linkages are selected from the group consisting of SiSi and SiR'Si linkages where R' is a divalent hydrocarbon radical, the remaining valences of the silicon atoms in siloxane A being satisfied by monovalent hydrocarbon radicals in amount of on the average from 1 to 1.5 of said radicals per silicon atom and radicals of the formula OR" in which R" is an aliphatic hydrocarbon radical, in amount of on the average from .03 to 2 OR" radicals per silicon atom and (B) less than 50% by weight based on the total weight of the siloxanes of a siloxane of the unit formula

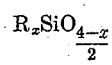

where R is a monovalent hydrocarbon radical and $x$ has an average value of from 1 to 2.

4. A phenolic resin cement comprising a mixture of (1) a preprepared phenol-formaldehyde resin, (2) a filler, (3) a setting catalyst for the phenol-formaldehyde resin and (4) from .5 to 15% by weight based on the weight of the phenolic resin of a siloxane composed of an aliphatic hydrocarbonoxy siloxane in which at least a major portion of the polymer linkages are SiOSi linkages and any remaining linkages are selected from the group consisting of SiSi and SiR'Si linkages where R' is a divalent hydrocarbon radical, the remaining valences of the silicon atoms in said siloxane being satisfied by monovalent hydrocarbon radicals in amount of on the average from 1 to 1.5 of said radicals per silicon atom and radicals of the formula OR" in which R' is an aliphatic hydrocarbon radical, in amount of on the average from .03 to 2 OR" radicals per silicon atom.

5. A phenolic resin cement comprising a mixture of (1) a preprepared phenol-formaldehyde resin, (2) a filler and (3) from .5 to 15% by weight based on the weight of the phenolic resin of a siloxane composed of a mixture of (A) an alkoxylated siloxane in which a major portion of the polymer linkages are SiOSi linkages, the remaining linkages being SiSi and SiR'Si where R' is an alkylene radical of less than 3 carbon atoms, the remaining valences of the silicon atoms in siloxane A being satisfied by alkyl radicals of less than 5 carbon atoms, said radicals being present in amount of on the average from 1 to 1.5 per silicon atom and alkoxy radicals containing less than 6 carbon atoms, in amount of on the average from .03 to 2 alkoxy radicals per silicon atom and (B) less than 50% by weight based on the total weight of the siloxanes of a siloxane of the unit formula

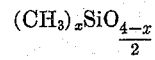

where $x$ has an average value from 1 to 2.

References Cited in the file of this patent
UNITED STATES PATENTS

| | | |
|---|---|---|
| 2,672,104 | Clark | Mar. 16, 1954 |
| 2,698,334 | Rust et al. | Dec. 28, 1954 |
| 2,755,269 | Moorhead | July 17, 1956 |

UNITED STATES PATENT OFFICE

CERTIFICATE OF CORRECTION

Patent No. 2,927,910            March 8, 1960

Ronald H. Cooper

It is hereby certified that error appears in the printed specification of the above numbered patent requiring correction and that the said Letters Patent should read as corrected below.

Column 6, line 2, for "$R'$" read -- $R''$ --.

Signed and sealed this 6th day of September 1960.

(SEAL)
Attest:
ERNEST W. SWIDER
Attesting Officer

ROBERT C. WATSON
Commissioner of Patents